United States Patent
Ninomiya et al.

(10) Patent No.: US 8,587,846 B2
(45) Date of Patent: Nov. 19, 2013

(54) DETECTION DEVICE AND IMAGE FORMING DEVICE

(75) Inventors: Kota Ninomiya, Kanagawa (JP); Masao Ito, Kanagawa (JP); Fumio Furusawa, Kanagawa (JP); Katsuhiko Nakaie, Kanagawa (JP); Junichi Morooka, Kanagawa (JP); Shusaku Yokota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 210 days.

(21) Appl. No.: 13/117,664

(22) Filed: May 27, 2011

(65) Prior Publication Data

US 2012/0099168 A1 Apr. 26, 2012

(30) Foreign Application Priority Data

Oct. 22, 2010 (JP) ................... 2010-238009

(51) Int. Cl.
*H04N 1/04* (2006.01)

(52) U.S. Cl.
USPC ........... 358/498; 358/449; 358/474; 358/496; 399/14

(58) Field of Classification Search
USPC ........ 358/1.15, 1.13, 1.9, 474, 498, 449, 496; 399/14, 15, 16
See application file for complete search history.

(56) References Cited

U.S. PATENT DOCUMENTS

| | | | | |
|---|---|---|---|---|
| 5,416,562 A * | 5/1995 | Ota et al. | ................. | 355/53 |
| 5,654,553 A * | 8/1997 | Kawakubo et al. | ............ | 250/548 |
| 6,078,380 A * | 6/2000 | Taniguchi et al. | ................. | 355/52 |
| 7,127,098 B2 * | 10/2006 | Shimoda et al. | ................. | 382/145 |
| 7,209,159 B2 * | 4/2007 | Hamano et al. | ................. | 347/249 |
| 7,583,864 B2 * | 9/2009 | Susaki | ................. | 382/312 |
| 7,666,138 B2 * | 2/2010 | Ogawa | ................. | 600/442 |
| 8,064,105 B2 * | 11/2011 | Murakami et al. | ................. | 358/461 |
| 8,149,473 B2 * | 4/2012 | Oshida et al. | ................. | 358/474 |
| 8,159,731 B2 * | 4/2012 | Sato et al. | ................. | 358/497 |
| 8,310,736 B2 * | 11/2012 | Nakajima | ................. | 358/474 |
| 8,310,741 B2 * | 11/2012 | Tashiro et al. | ................. | 358/509 |
| 8,427,719 B2 * | 4/2013 | Fujiwara | ................. | 358/488 |
| 8,482,824 B2 * | 7/2013 | Nagasaka | ................. | 358/509 |

FOREIGN PATENT DOCUMENTS

JP 2010-114498 A 5/2010

\* cited by examiner

*Primary Examiner* — Negussie Worku

(74) *Attorney, Agent, or Firm* — Sughrue Mion, PLLC

(57) ABSTRACT

There is provided a detection device including: a detection section detecting an image on a medium conveyed along the conveyance path or the medium; a reference member that is disposed at an opposite side of the conveyance path from the side thereof at which the illumination unit is disposed and that is provided to be rotatable with a rotation axis direction being a width direction of the medium; a test face comprising one of reflection faces of the reference member; a position detection pattern provided at the test face; a focal point detection pattern provided at the test face, the focal point detection pattern enabling detection by the detection section of a focal point; and a depth detection portion provided at the test face, the depth detection portion enabling detection by the detection section of an illumination depth of the light illuminated from a illumination unit.

5 Claims, 10 Drawing Sheets

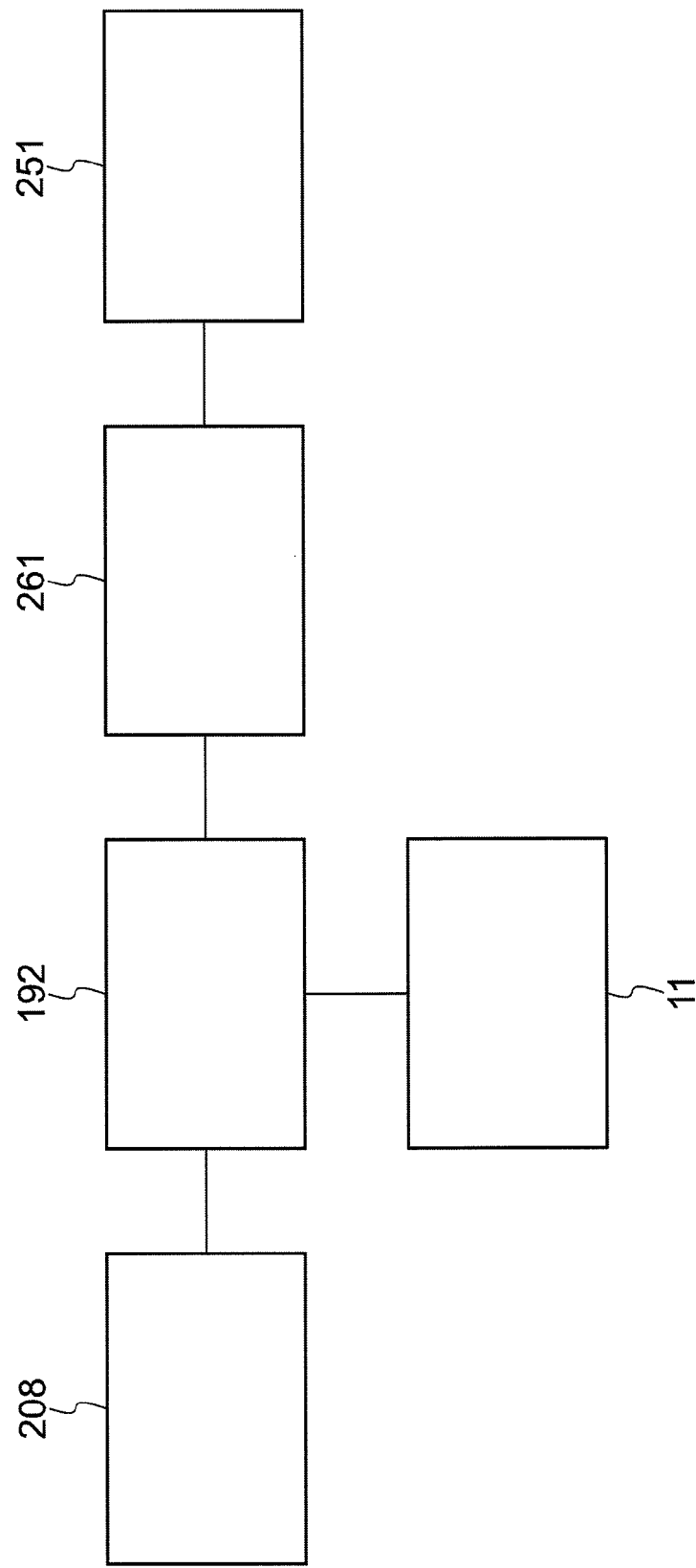

DETECTION DEVICE AND IMAGE FORMING DEVICE

CROSS-REFERENCE TO RELATED APPLICATION

This application is based on and claims priority under 35 USC 119 from Japanese Patent Application No. 2010-238009 filed on Oct. 22, 2010.

BACKGROUND

1. Technical Field

The present invention relates to a detection device and an image forming device.

2. Related Art

An image forming device is known of, for example, an electro photography type, an inkjet type or the like, that is provided with an image reading section that reads an image on paper on which the image has been formed. This image forming device may, for example, determine whether or not colors of the image read by the image reading section are intended colors and apply correction as necessary.

SUMMARY OF THE INVENTION

A first aspect of the present invention provides a detection device including:
a detection section including
an illumination unit that illuminates light toward a conveyance path along which a medium is conveyed, and
a light-sensing unit that senses reflected light of the light illuminated from the illumination unit,
the detection section detecting at least one of an image on the medium conveyed along the conveyance path or the medium;
a reference member that is disposed at an opposite side of the conveyance path from the side thereof at which the illumination unit is disposed and that is provided to be rotatable with a rotation axis direction being a width direction of the medium, the reference member having a polygonal rod shape that includes plural reflection faces that reflect the light illuminated by the illumination unit toward the detection section, and the reference member being configured such that any of the reflection faces may be caused to oppose the conveyance path by rotation of the reference member;
a test face comprising one of the reflection faces of the reference member;
a position detection pattern provided at the test face, the position detection pattern enabling detection by the detection section of a position of the test face in the direction of rotation;
a focal point detection pattern provided at the test face, the focal point detection pattern enabling detection by the detection section of a focal point; and
a depth detection portion provided at the test face, the depth detection portion enabling detection by the detection section of an illumination depth of the light illuminated from the illumination unit.

BRIEF DESCRIPTION OF THE DRAWINGS

An exemplary embodiment of the present invention will be described in detail based on the following figures, wherein:

FIG. 10 is a block diagram of correction control of the inline sensor of the image forming device relating to the exemplary embodiment of the present invention.

DETAILED DESCRIPTION

An example of a detection device and image forming device relating to an exemplary embodiment of the present invention will be described in accordance with FIG. 1 to FIG. 10.

-Overall Structure-

Figure 1:
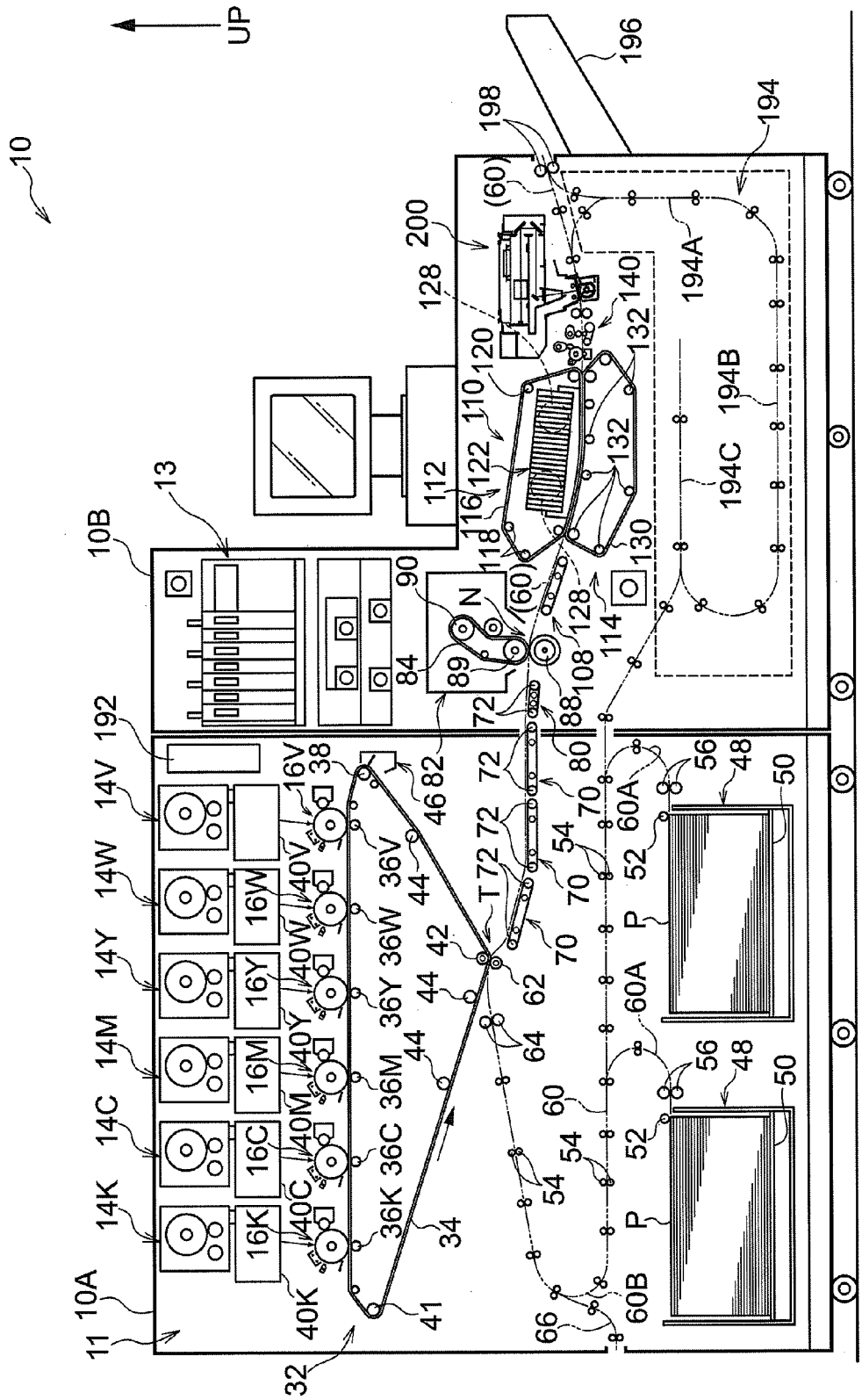
FIG. 1 is a schematic structural diagram illustrating an image forming device relating to an exemplary embodiment of the present invention.

An image forming device 10 relating to the present exemplary embodiment forms a full-color image or a black-and-white image. As illustrated in FIG. 1, the image forming device 10 is provided with a first casing 10A and a second casing 10B. The first casing 10A accommodates a first processing section 11 that serves as an example of an image forming section, comprising a portion at one horizontal direction side of the image forming device 10 (the left side in FIG. 1). The second casing 10B is detachably connected to the first casing 10A and accommodates a second processing section comprising the other horizontal direction side of the image forming device 10 (the right side in FIG. 1). The image forming device 10 is controlled by a control device 192 that serves as an example of a control section.

An image signal processing section 13 is provided at an upper portion of the second casing 10B. The image signal processing section 13 applies image processing to image data arriving from an external device such as a computer or the like.

Toner cartridges 14V, 14W, 14Y, 14M, 14C and 14K are replaceable provided side by side in a horizontal direction at an upper portion of the first casing 10A. The toner cartridges 14V, 14W, 14Y, 14M, 14C and 14K accommodate toners of a first special color (V), a second special color (W), yellow (Y), magenta (M), cyan (C) and Black (K).

The first special color and the second special color are selected as appropriate from special colors (including transparent) other than yellow, magenta, cyan and black. In the descriptions herebelow, where the first special color (V), the second special color (W), yellow (Y), magenta (M), cyan (C) and Black (K) are to be distinguished, descriptions are given with one or other of the letters V, W, Y, M, C and K appended to the end of reference numerals, and where the first special color (V), the second special color (W), yellow (Y), magenta (M), cyan (C) and Black (K) are not to be distinguished, the letters V, W, Y, M, C and K are omitted.

Below the toner cartridges 14, six image forming units 16 are disposed side by side in the horizontal direction, in correspondence with the toner cartridges 14. The image forming units 16 serve as examples of image forming sections corresponding to the respective toners.

Exposure units 40 are provided in correspondence with the respective image forming units 16. The exposure units 40 are configured to receive image data that has been subjected to image processing by the above-mentioned image signal processing section 13 from the image signal processing section 13 and to illuminate light beams L modulated in accordance with this image data at image-bearing bodies 18, which are described below (see FIG. 2).

Figure 2:
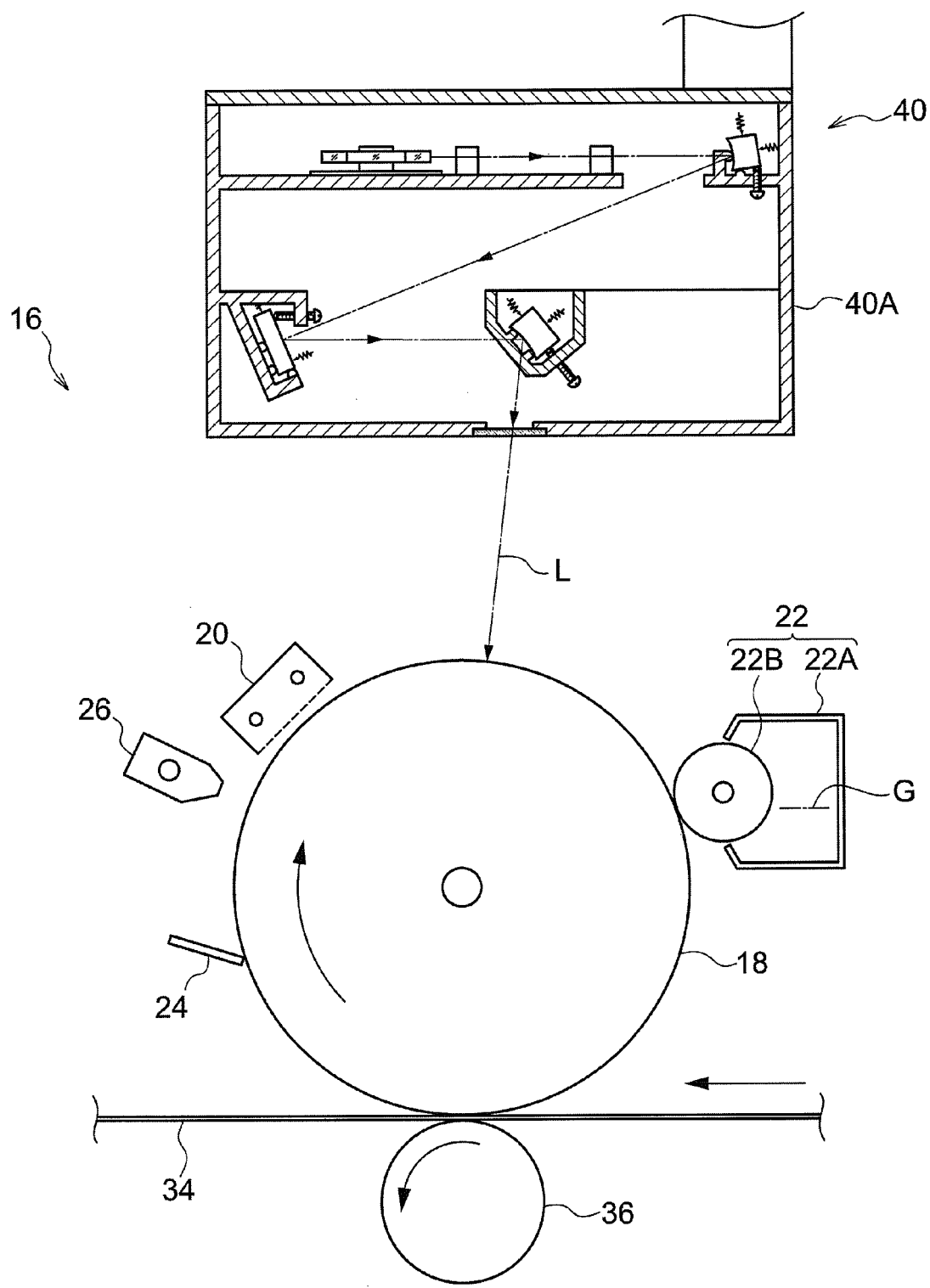
FIG. 2 is a sectional diagram illustrating an image forming unit employed in the image forming device relating to the exemplary embodiment of the present invention.

As illustrated in FIG. 2, each image forming unit 16 is provided with the image-bearing body 18, which is driven to rotate in one direction (the clockwise direction in FIG. 2). An electrostatic latent image is formed on the image-bearing body 18 by the light beam L being illuminated from the exposure unit 40 at the image-bearing body 18. The exposure unit 40 is described in detail below.

A scorotron charger 20, a developing device 22, a blade 24 and an erasure lamp 26 are provided around the image-bearing body 18. The scorotron charger 20 is a charger of a corona discharge type (a non-contact electrostatic type) that charges up the image-bearing body 18. The developing device 22 develops an electrostatic latent image that has been formed on the image-bearing body 18 by the exposure unit 40 with a developer. The blade 24 serves as a removal member that removes developer remaining on the image-bearing body 18 after a transfer. The erasure lamp 26 illuminates light onto the surface of the image-bearing body 18 after the transfer and de-electrifies the image-bearing body 18.

The scorotron charger 20, the developing device 22, the blade 24 and the erasure lamp 26 are disposed to oppose the surface of the image-bearing body 18 in this order from the upstream side to the downstream side of the direction of rotation of the image-bearing body 18.

The developing device 22 includes a developer accommodation member 22A and a developing roller 22B. The developer accommodation member 22A accommodates a developer G that includes a toner. The developing roller 22B supplies the developer G accommodated in the developer accommodation member 22A to the image-bearing body 18. The developer accommodation member 22A is connected with the toner cartridge 14 (see FIG. 1) via a toner supply path (not illustrated), and is supplied with toner from the toner cartridge 14.

As illustrated in FIG. 1, a transfer section 32 is disposed below the image forming units 16. The transfer section 32 includes a loop-form intermediate transfer belt 34 and first transfer rollers 36. The intermediate transfer belt 34 touches against the image-bearing bodies 18. The first transfer rollers 36 serve as first transfer members that superposed transfer the toner images formed on the image-bearing bodies 18 onto the intermediate transfer belt 34.

The intermediate transfer belt 34 is wound round a driving roller 38, a tension application roller 41, an opposing roller 42 and plural winding rollers 44. The driving roller 38 is driven by an unillustrated motor. The tension application roller 41 applies tension to the intermediate transfer belt 34. The opposing roller 42 opposes a second transfer roller 62, which is described below. The intermediate transfer belt 34 is moved to turn in one direction (the counterclockwise direction in FIG. 1) by the driving roller 38.

Each first transfer roller 36 is disposed to oppose the image-bearing body 18 of the respective image forming unit 16, sandwiching the intermediate transfer belt 34. A transfer bias voltage of a polarity opposite to a polarity of the toner is applied to the first transfer roller 36 by an electricity supply unit (not illustrated). The toner image formed on the image-bearing body 18 is transferred to the intermediate transfer belt 34 by this structure.

A removal device 46 is provided to sandwich the intermediate transfer belt 34, at the opposite side thereof from the side at which the driving roller 38 is disposed. A blade thereof is touched against the intermediate transfer belt 34, and the removal device 46 removes residual toner, paper dust and the like on the intermediate transfer belt 34.

Two recording medium accommodation portions 48, in which recording mediums P such as paper or the like are accommodated, are provided side by side in the horizontal direction below the transfer section 32.

Each recording medium accommodation portion 48 can be withdrawn from the first casing 10A. A feed-out roller 52 is disposed above one end side of the recording medium accommodation portion 48 (the right side in FIG. 1). The feed-out roller 52 feeds out the recording mediums P from the recording medium accommodation portion 48 to a conveyance path 60.

A bottom plate 50 is provided in the recording medium accommodation portion 48. The recording mediums P are placed on the bottom plate 50. When the recording medium accommodation portion 48 is to be drawn out from the first casing 10A, the bottom plate 50 descends in accordance with instruction from the control device 192. Because the bottom plate 50 descends, a space is formed in the recording medium accommodation portion 48 into which a user may replenish the recording mediums P.

When the recording medium accommodation portion 48 drawn out from the first casing 10A is again pushed into the first casing 10A, the bottom plate 50 ascends in accordance with instruction from the control device 192. When the bottom plate 50 ascends, the topmost recording medium P placed on the bottom plate 50 comes into contact with the feed-out roller 52.

Separation rollers 56 are provided at the downstream side in a recording medium conveyance direction (which may hereinafter simply be referred to as the downstream side) relative to the feed-out roller 52. The separation rollers 56 separate any recording mediums P that are overlapping fed out from the recording medium accommodation portion 48 into individual sheets. Plural conveyance rollers 54 are provided at the downstream side of the separation rollers 56. The conveyance rollers 54 convey the recording mediums P downstream in the conveyance direction.

The conveyance path 60 provided between the recording medium accommodation portion 48 and the transfer section 32 turns a recording medium P fed out from the recording medium accommodation portion 48 back to the left side in FIG. 1 at a first turn back portion 60A, and then turns the recording medium P back to the right side in FIG. 1 at a second turn back portion 60B. The conveyance path 60 extends to a transfer position T between a second transfer roller 62 and the opposing roller 42.

A transfer bias voltage of the opposite polarity to the toner polarity is applied to the second transfer roller 62 by an electricity supply unit (not illustrated). In this structure, the toner images of the respective colors that have been transferred onto the intermediate transfer belt 34 are second-transferred by the second transfer roller 62 onto the recording medium P that has been conveyed thereto along the conveyance path 60.

An alternative path 66 that extends from a side face of the first casing 10A is provided so as to merge with the second turn back portion 60B of the conveyance path 60. Recording mediums P that are fed from a separate recording medium accommodation portion (not illustrated) disposed adjacent to the first casing 10A pass along the alternative path 66 and into the conveyance path 60.

At the downstream side of the transfer position T, plural conveyance belts 70 are provided in the first casing 10A. The conveyance belts 70 convey a recording medium P to which a toner image has been transferred toward the second casing 10B. A conveyance belt 80 that conveys a recording medium P that has been conveyed by the conveyance belts 70 further downstream is provided in the second casing 10B.

Each of the plural conveyance belts 70 and the conveyance belt 80 is formed in a loop and wound round a pair of winding rollers 72. Each pair of winding rollers 72 is disposed at the recording medium P conveyance direction upstream side and downstream side. By one of each pair of winding rollers 72 being driven to rotate, the conveyance belt 70 (or conveyance belt 80) is moved to turn in one direction (the clockwise direction in FIG. 1).

A fixing unit 82 is disposed at the downstream side of the conveyance belt 80. The fixing unit 82 fixes the toner image that has been transferred onto the surface of a recording medium P to the recording medium P by heat and pressure.

The fixing unit 82 is provided with a fixing belt 84 and a pressure roller 88 that is disposed so as to touch against the fixing belt 84 from the lower side thereof. A fixing portion N is formed between the fixing belt 84 and the pressure roller 88. In the fixing portion N, the recording medium P is pressed and heated and the toner image is fixed.

The fixing belt 84 is formed in a loop and is wound round a driving roller 89 and a following roller 90. The driving roller 89 opposes the pressure roller 88 from the upper side thereof, and the following roller 90 is disposed at the upper side relative to the driving roller 89.

The driving roller 89 and the following roller 90 both incorporate a heating unit such as a halogen heater or the like. Thus, the fixing belt 84 is heated.

As illustrated in FIG. 1, a conveyance belt 108 is provided at the downstream side of the fixing unit 82. The conveyance belt 108 conveys a recording medium P that is fed out from the fixing unit 82 downstream. The conveyance belt 108 has a similar form to the conveyance belts 70.

A cooling unit 110 is provided at the downstream side of the conveyance section 108. The cooling unit 110 cools the recording medium P that has been heated by the fixing unit 82.

The cooling unit 110 includes an absorbing device 112 that absorbs heat from the recording medium P and a pressing apparatus 114 that presses the recording medium P against the absorbing device 112. The absorbing device 112 is disposed at one side of the conveyance path 60 (the upper side in FIG. 1) and the pressing apparatus 114 is disposed at the other side (the lower side in FIG. 1).

The absorbing device 112 is provided with a looped absorbing belt 116 that touches against the recording medium P and absorbs the heat of the recording medium P. The absorbing belt 116 is wound round a driving roller 120, which transmits driving force to the absorbing belt 116, and plural winding rollers 118.

A heat sink 122 formed of an aluminium-based material is disposed at the inner periphery side of the absorbing belt 116. The heat sink 122 makes surface contact with the absorbing belt 116 and is heated by the heat that has been absorbed by the absorbing belt 116.

A fan 128 for drawing heat from the heat sink 122 and ejecting hot air to the exterior is disposed at a rear side of the second casing 10B (the paper depth side of FIG. 1).

The pressing apparatus 114 that presses the recording medium P against the absorbing device 112 is provided with a loop-form pressing belt 130 that presses the recording medium P against the absorbing belt 116 while conveying the recording medium P. The pressing belt 130 is wound round plural winding rollers 132.

A straightening device 140 is provided at the downstream side of the cooling unit 110. The straightening device 140 nips and conveys the recording medium P, and straightens curl (bending) of the recording medium P.

An inline sensor 200 is provided at the downstream side of the straightening device 140. The inline sensor 200 serves as an example of a detection device that detects toner density flaws, image flaws and image positioning flaws in the toner image fixed to the recording medium P, the position and shape of the recording medium P, and the like. The inline sensor 200 is described in detail below.

Ejection rollers 198 are disposed at the downstream side of the inline sensor 200. The ejection rollers 198 eject a recording medium P on one face of which an image has been formed to an ejection section 196 attached to a side face of the second casing 10B.

Alternatively, when images are to be formed at both faces, the recording medium P fed out from the inline sensor 200 is conveyed into an inversion path 194 provided at the downstream side of the inline sensor 200.

A branch path 194A, a paper conveyance path 194B and an inversion path 194C are provided in the inversion path 194. The branch path 194A branches from the conveyance path 60. The paper conveyance path 194B conveys a recording medium P conveyed along the branch path 194A toward the first casing 10A. The inversion path 194C turns the recording medium P conveyed along the paper conveyance path 194B to the opposite direction and performs switchback conveyance to invert the recording medium P front to back.

The recording medium P that has been switchback-conveyed by the inversion path 194C is conveyed toward the first casing 10A, then enters the conveyance path 60 provided above the recording medium accommodation portions 48, and is fed to the transfer position T again.

Next, an image forming process in the image forming device 10 is described.

Image data to which image processing has been applied by the image signal processing section 13 is sent to the exposure units 40. At the exposure units 40, respective light beams L corresponding to the image data are emitted and expose the image-bearing bodies 18 that have been charged up by the scorotron chargers 20, and electrostatic latent images are formed.

As illustrated in FIG. 2, the electrostatic latent images formed on the image-bearing bodies 18 are made visible by the developing devices 22, and toner images are formed of the respective colors: the first special color (V), the second special color (W), yellow (Y), magenta (M), cyan (C) and black (K).

As illustrated in FIG. 1, the toner images of the respective colors that have been formed on the image-bearing bodies 18 of the image forming units 16V, 16W, 16Y, 16M, 16C and 16K are sequentially transferred onto the intermediate transfer belt 34 by the six first transfer rollers 36V, 36W, 36Y, 36M, 36C and 36K.

The toner images of the respective colors that have been transferred onto the intermediate transfer belt 34 are second-transferred by the second transfer roller 62 onto a recording medium P that is conveyed thereto from the recording medium accommodation portions 48. The recording medium P to which the toner images have been transferred is conveyed by the conveyance belts 70 to the fixing unit 82 disposed inside the second casing 10B.

The toner images of the respective colors on the recording medium P are heated and pressured by the fixing unit 82, and thus fixed to the recording medium P. The recording medium P to which the toner images have been fixed passes through the cooling unit 110 and is cooled, and is then fed into the straightening device 140 and curl that has arisen in the recording medium P is straightened.

The recording medium P whose curl has been straightened is subjected to detection of image flaws and the like by the inline sensor 200, and is then ejected to the ejection section 196 by the ejection rollers 198.

If an image is to be formed at a non-image face at which an image has not been formed (in a case of two-sided printing), then after passing the inline sensor 200, the recording medium P is inverted by the inversion path 194, is fed into the conveyance path 60 provided above the recording medium accommodation portions 48, and a toner image is formed at the rear face by the procedure described above.

In the image forming device 10 relating to the present exemplary embodiment, components for forming images with the first special color and the second special color (the image forming units 16V and 16W, the exposure units 40V and 40W, the toner cartridges 14V and 14W and the first transfer rollers 36V and 36W) are configured to be mountable at the first casing 10A as additional components in accordance with selection by a user. Therefore, the image forming device 10 may have a configuration that does not include components for forming images with the first special color and the second special color, or a configuration that includes components for forming an image with only one of the first special color and the second special color.

-Inline Sensor-

Next, the inline sensor 200 of the present exemplary embodiment is described.

In the following descriptions, a direction of conveyance of the recording medium P (a slow scanning direction) at a detection position K of the inline sensor 200 (see FIG. 4, described in more detail below) is an X direction, a width direction of the recording medium P (a fast scanning direction) at the detection position K of the inline sensor 200 is a Z direction, and a direction out of the surface of the recording medium P at the detection position K of the inline sensor 200, which is a direction orthogonal to the X direction and the Z direction, is a Y direction.

-Basic Structure and Functions of the Inline Sensor-

Figure 3:
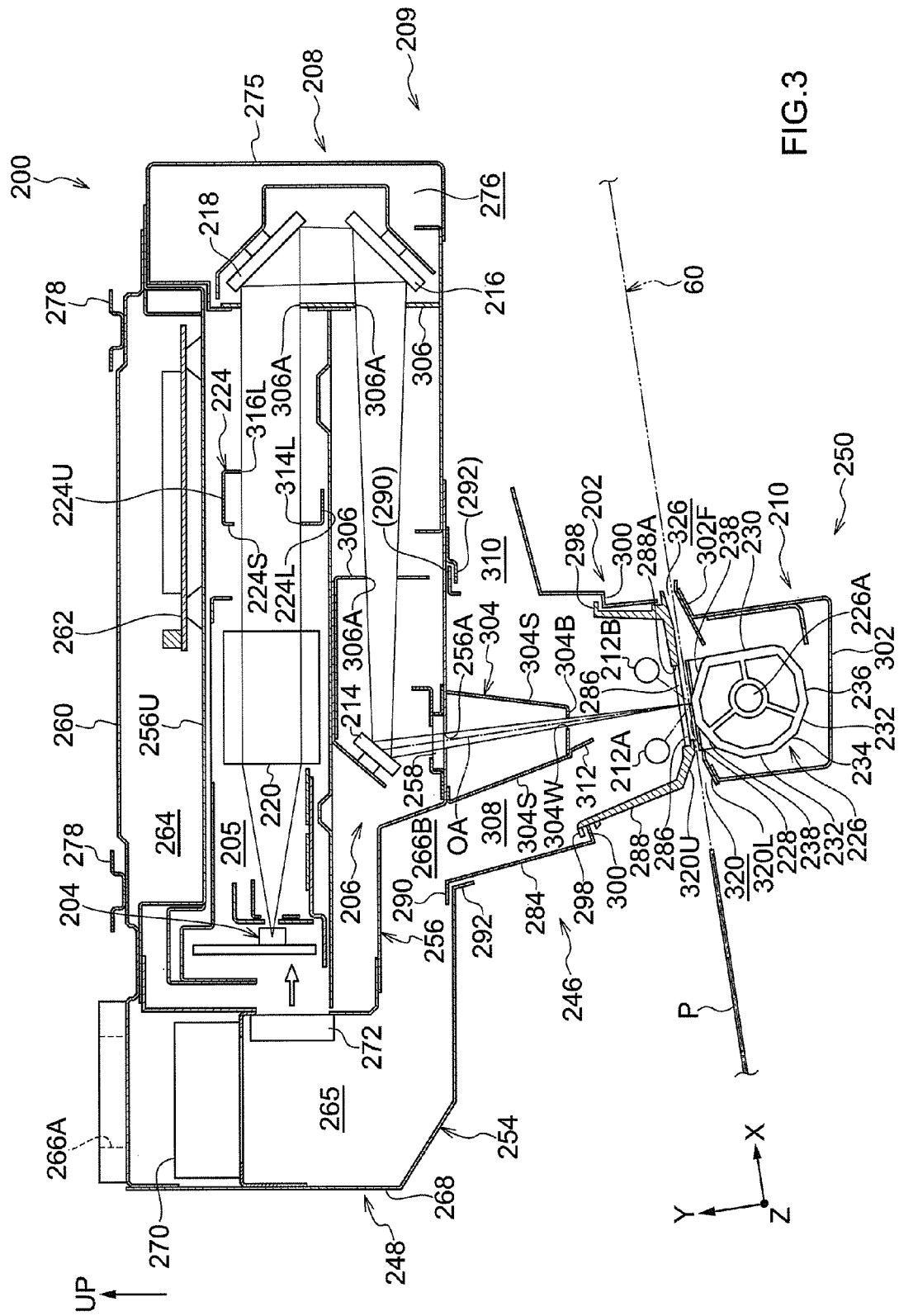
FIG. 3 is a sectional diagram illustrating an inline sensor relating to the exemplary embodiment of the present invention.

As illustrated in FIG. 3, the inline sensor 200 is provided with a detection section 209 that serves as an example of a detection section and includes an illumination section 202 and a focusing section 208. The illumination section 202 serves as an example of an illumination unit that illuminates light toward a recording medium P on which an image has been recorded. The focusing section 208 is provided with a focusing optical system 206 that focuses light illuminated from the illumination section 202 and reflected by the recording medium P onto a CCD sensor 204. The inline sensor 200 is further provided with a setting section 210 at which various references and the like are set for when using the inline sensor 200, when calibrating the same, and the like.

The illumination section 202 comprising the detection section 209 is disposed above the conveyance path 60 of the recording medium P, and includes a pair of lamps 212 that serve as an example of a light source. The lamps 212 are xenon lamps disposed with length directions thereof in the Z direction, and Z-direction lengths of illumination ranges thereof are greater than the width of the largest recording medium P that may be conveyed. The pair of lamps 212 are disposed at the two X-direction sides of an optical axis OA (a design optical axis) of the light reflected from the recording medium P toward the focusing section 208. The pair of lamps 212 are disposed with symmetry about the optical axis OA. More specifically, the lamps 212 are disposed with symmetry about the optical axis OA such that illumination angles of the lamps 212 on the recording medium P are both 45° to 50°.

In more detail, the pair of lamps 212 is provided with a first lamp 212A that serves as an example of a first light source, which is disposed at the upstream side in the conveyance direction of the recording medium P, and a second lamp 212B that serves as an example of a second light source, which is disposed to sandwich the optical axis OA at the opposite side thereof from the side at which the first lamp 212A is disposed.

The present exemplary embodiment is configured such that the optical axis OA coincides with the Y direction.

The focusing optical system 206 comprising the detection section 209 is configured with a first mirror 214, a second mirror 216, a third mirror 218 and a lens 220 as principal components. The first mirror 214 reflects light guided along the optical axis OA toward the recording medium P conveyance direction downstream side. The second mirror 216 reflects the light reflected by the first mirror 214 upward. The third mirror 218 reflects the light reflected by the second mirror 216 toward the recording medium P conveyance direction upstream side. The lens 220 condenses (focuses) the light reflected by the third mirror 218 onto the CCD sensor 204. In the present exemplary embodiment, the CCD sensor 204 is disposed at the recording medium P conveyance direction upstream side relative to the optical axis OA.

The Z-direction length of the first mirror 214 is greater than the width of the largest recording medium P. The first mirror 214 to third mirror 218 reflect the reflected light from the recording medium P that is incident into the focusing optical system 206 while narrowing down the reflected light in the Z direction (the fast scanning direction). Thus, this structure makes the reflected light from respective width direction portions of the recording medium P incident on the lens 220 that has a substantially cylindrical shape.

With the constitution described above, from the inline sensor 200, the CCD sensor 204 of the focusing section 208 outputs (feeds back) signals in accordance with the focused light, which is to say image densities, to the control device 192 of the image forming device 10 as illustrated in FIG. 1 and FIG. 10. On the basis of the signals from the inline sensor 200, the control device 192 corrects the images formed at the image forming units 16. In the image forming device 10, as an example, the intensities of the illumination lights from the exposure units 40, image formation positions and the like are corrected on the basis of the signals from the inline sensor 200.

As illustrated in FIG. 3, a light amount restriction portion 224 is provided between the third mirror 218 and lens 220 of the focusing optical system 206. The light amount restriction portion 224 cuts across the light path in the Z direction and constricts a light amount of the light focused on the CCD sensor 204 in the Y direction (the direction that is orthogonal to the fast scanning direction and the slow scanning direction), and is configured to be capable of adjusting a light amount constriction amount by control from outside. The configuration is such that the light amount constriction amount by the light amount restriction portion 224 is adjusted such that a light amount focused on the CCD sensor 204 is a pre-specified amount even if a light emission amount of the lamps 212 changes with the passage of time.

Figure 4:
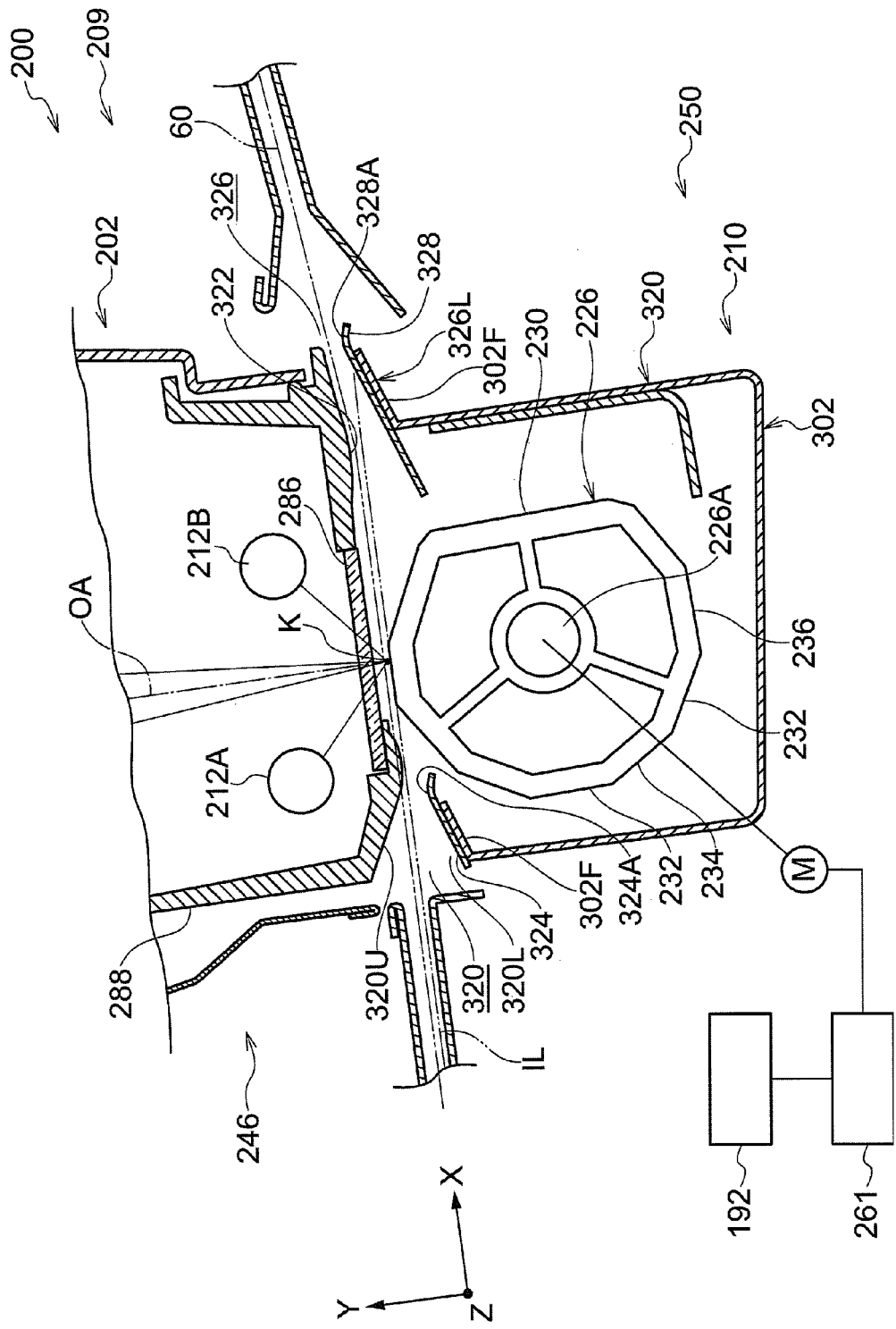
FIG. 4 is a diagram showing a sectional diagram and a block diagram illustrating a lower unit provided at the inline sensor relating to the exemplary embodiment of the present invention.

As illustrated in FIG. 3 and FIG. 4, the setting section 210 is provided with a reference roll 226 that serves as an example of a reference member, which is disposed with a length direction thereof in the Z direction. The reference roll 226 includes a detection reference face 228, a retraction face 230, a white reference face 232, a color reference face 234 and a composite test face 236. The detection reference face 228 opposes the conveyance path 60 when image detection of a recording medium P is being carried out, and the retraction face 230 opposes the conveyance path when image detection of a recording medium P is not being carried out by the inline sensor 200. The white reference face 232 is an example of a reflection face. The color reference face 234 is an example of a reflection face on which a multi-color pattern is formed along the length direction. The composite test face 236 is an example of a reflection face and a test face on which plural test patterns are formed.

In the present exemplary embodiment, the reference roll 226 is formed in a polygonal tube shape with eight or more faces being formed in the circumferential direction. The detection reference face 228, the retraction face 230, the color reference face 234 and the composite test face 236 are provided one each, and two of the white reference faces 232 are provided.

The reference roll 226 is configured to switch the face that opposes the conveyance path 60 by turning about a rotation axle 226A. As illustrated in FIG. 4 and FIG. 10, the reference roll 226 is configured to be rotated by a pulse motor 251 (see FIG. 4), which is an example of a control unit. The pulse motor 251 is controlled by a control circuit 261, which is an example of a control section. The control circuit 261 is provided at a circuit board 262 (see FIG. 3 and FIG. 9), which is described below.

Switching of the face of the reference roll 226 and control of rotation angles thereof are implemented by control signals sent to the control circuit 261 from the control device 192 (see FIG. 1, FIG. 4 and FIG. 10).

As illustrated in FIG. 3 and FIG. 4, because the reference roll 226 is formed as a polygonal tube with eight or more faces, differences between distances from the center of rotation to circumferential direction centers of each face and distances from the center of rotation to corners between the faces are kept small. Therefore, distances between the faces of the reference roll 226 and a window glass 286 that is described below are kept small without the corners between the faces of the reference roll 226 interfering with the illumination section 202.

The detection reference face 228 is formed with a smaller circumferential direction width than the other faces, and the faces at the two circumferential direction sides of the detection reference face 228 are guide surfaces 238 that do not have the above-mentioned reference functions. The detection reference face 228 serves as a position reference face that positions a detected face (that is to be read) of a recording medium P that is being conveyed at a position K of illumination by the lamps 212.

The focusing section 208 detects reflected light reflected from the recording medium P passing through the illumination position K. That is, the illumination position K is the detection position K at which image detection of the recording medium P is carried out.

The retraction face 230 has a larger circumferential direction width than the other faces. The retraction face 230 is a guide surface that guides the recording mediums P when image detection of the recording mediums P is not being carried out by the inline sensor 200. The retraction face 230 has a smaller distance from the axial center of the rotation axle 226A than the detection reference face 228. Therefore, when image detection of the recording mediums P is not being carried out by the inline sensor 200, the conveyance path is formed with a wider gap between the reference roll 226 and the illumination section 202 (the window glass 286) than when image detection of the recording mediums P is being carried out by the inline sensor 200.

The white reference face 232 is for calibration of the illumination section 202 and the focusing optical system 206, and is configured with a white film stuck on to the reference roll 226 for reference when a pre-specified signal is outputted from the focusing optical system 206.

The color reference face 234 is for calibration of the illumination section 202 and the focusing optical system 206, and is configured with a film stuck on to the reference roll 226 that is patterned with colors for reference when pre-specified signals corresponding to the colors are outputted from the focusing optical system 206.

Figure 5:
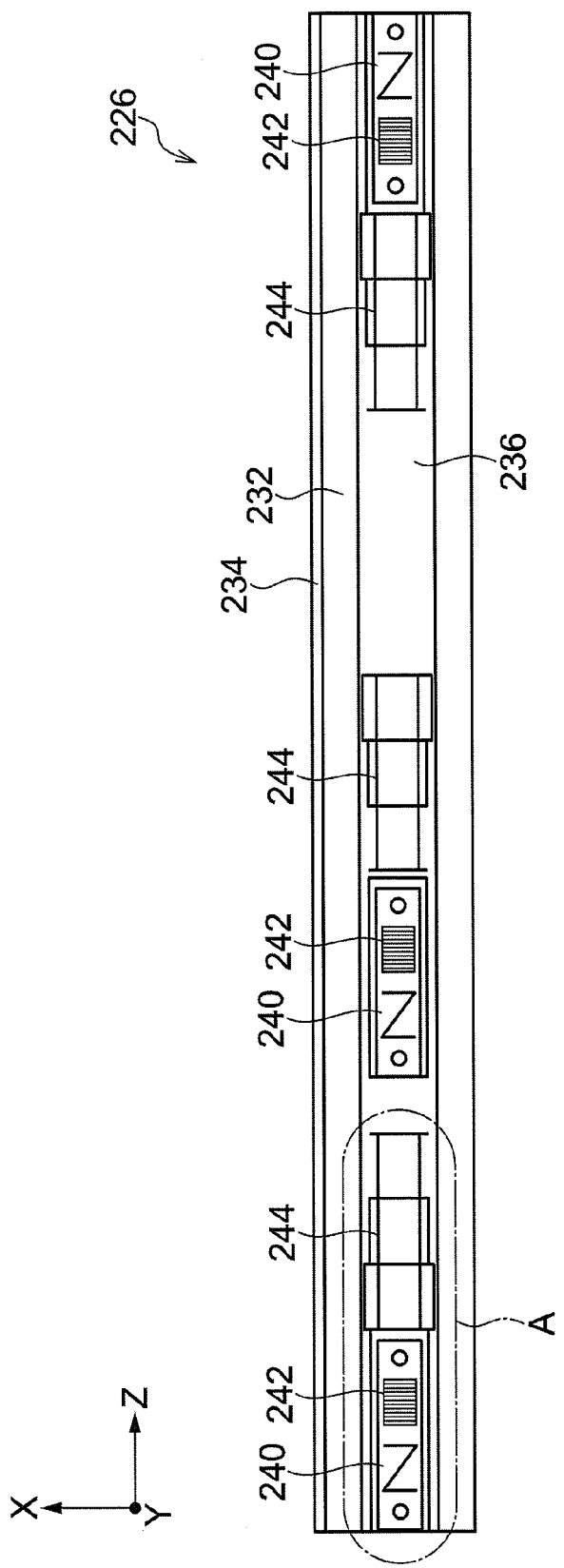
FIG. 5 is a plan diagram illustrating a composite test face of a reference roll provided at the inline sensor relating to the exemplary embodiment of the present invention.

As illustrated in FIG. 5, the composite test face 236 is configured with a position detection pattern 240, a focus detection pattern 242 and a depth detection portion 244 being arranged on the same surface. The position detection pattern 240 serves as an example of a position detection pattern for calibrating a position of the reference roll 226 in the rotation direction (the recording medium P conveyance direction). The focus detection pattern 242 serves as an example of a focal point detection pattern for detecting a focal point (resolution). The depth detection portion 244 is an example of a depth detection portion for detecting output of the CCD sensor 204 in association with illumination depth.

At least one of the position detection pattern 240 is provided at each of two length direction end portions of the composite test face 236. At each of the two end portions of the composite test face 236, the focus detection pattern 242 is disposed adjacent to the length direction inner side of the position detection pattern 240. The depth detection portion 244 is disposed adjacent to the length direction inner side of the focus detection pattern 242 at each of the two end portions of the composite test face 236, and is also disposed at a length direction central portion of the composite test face 236.

In the present exemplary embodiment, the position detection pattern 240 and the focus detection pattern 242 are also disposed between the depth detection portion 244 disposed at the central portion and the depth detection portion 244 disposed at one of the length direction ends, adjacent to the depth detection portions 244.

Figure 6:
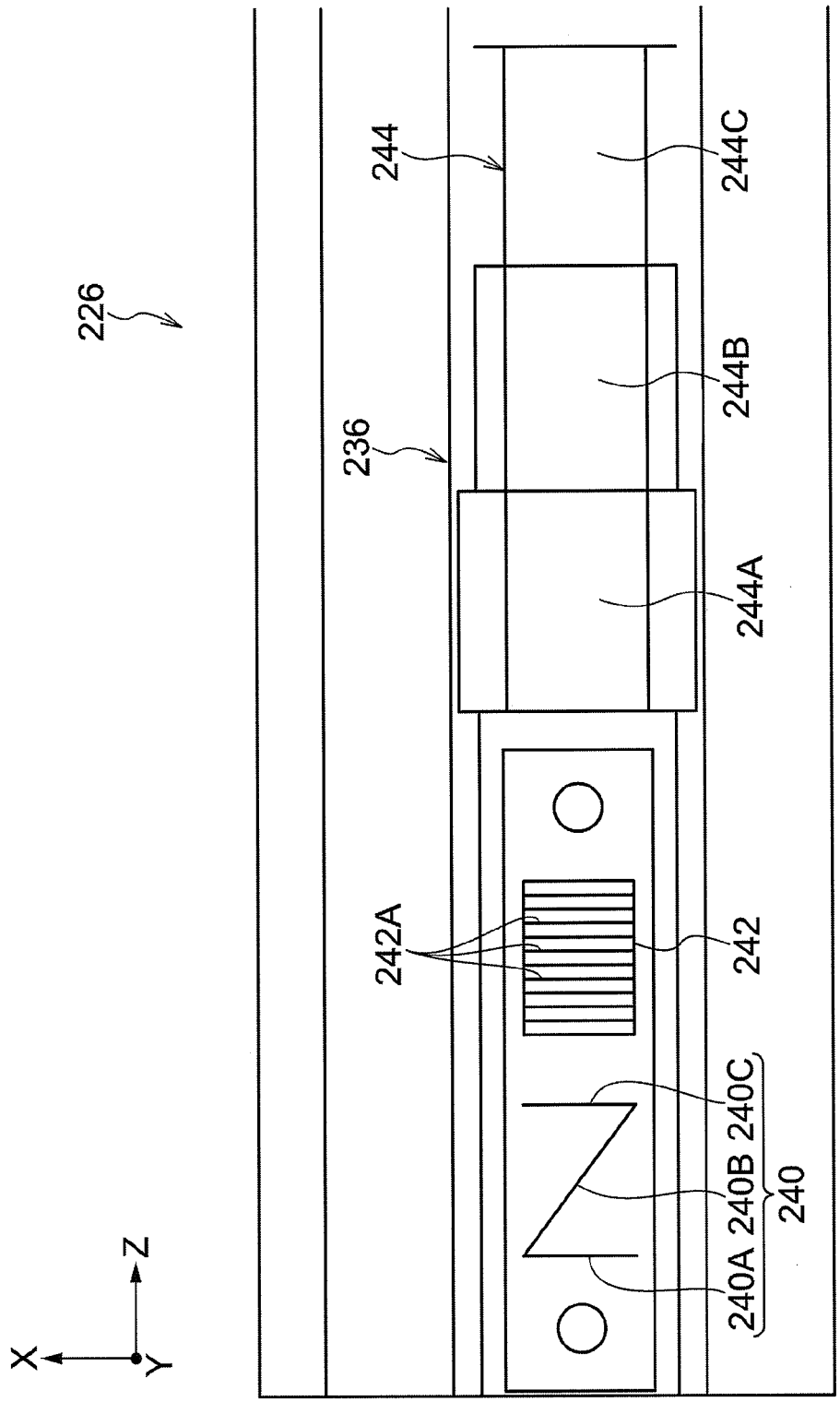
FIG. 6 is a magnified diagram in which a portion A of the composite test face in FIG. 5 is magnified.

As illustrated in FIG. 6, the position detection pattern 240 is configured by a film with a white background being stuck on. On this film, a black letter "N" shape is formed such that the uprights of the letter N are along the recording medium P conveyance direction. Describing the N shape more specifically, the N shape is structured by a linear portion 240A, a linear portion 240C and a diagonal portion 240B. The linear portion 240A and linear portion 240C run along the conveyance direction, the two being formed with a gap there between in the axial direction of the rotation axle 226A of the reference roll 226 (the width direction of the recording medium P). The diagonal portion 240B joins one end of the linear portion 240A with the other end of the linear portion 240C. In the present exemplary embodiment, the N shape is black with a line width of approximately 0.2 mm.

The focus detection pattern 242 is configured by a film with a white background on which a ladder pattern is formed being stuck on. The ladder pattern in the present exemplary embodiment is a stripe pattern in which plural linear portions 242A along the conveyance direction are formed with gaps there between in the rotation axis direction (the width direction). In the present exemplary embodiment, the linear portions 242A are black and ten thereof are formed, at 5 lp/mm.

Figure 7:
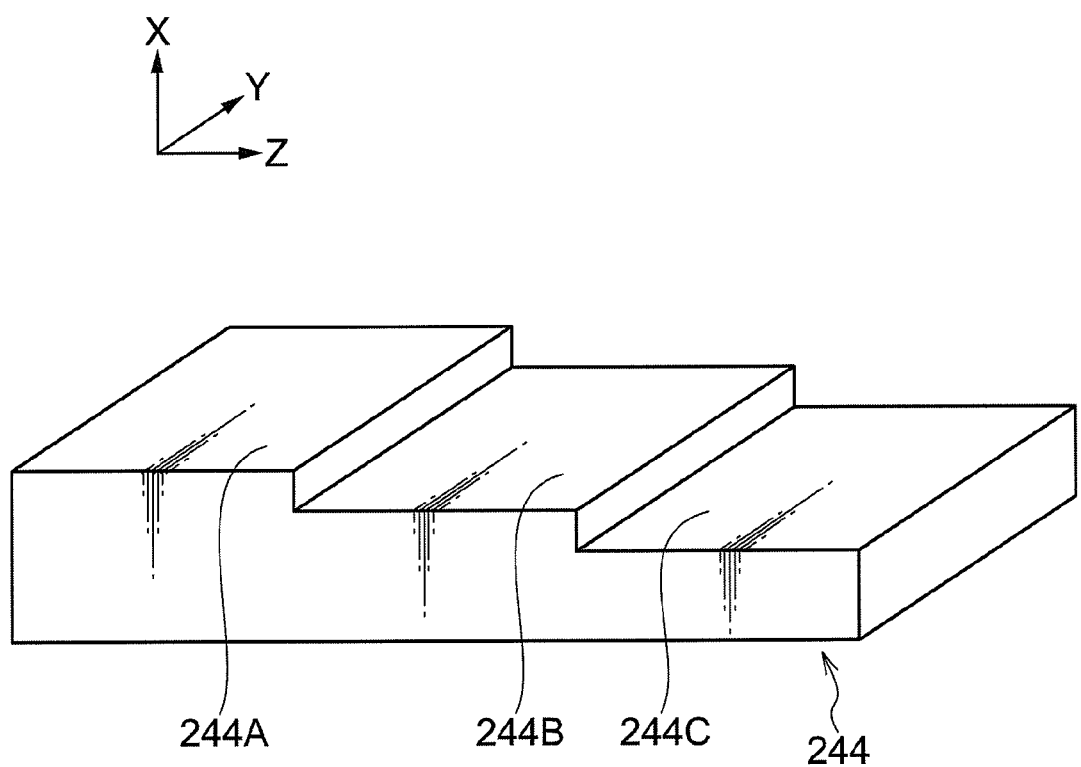
FIG. 7 is a perspective diagram illustrating a depth detection portion illustrated in FIG. 6.

As illustrated in FIG. 6 and FIG. 7, at the depth detection portion 244, three white surfaces 244A, 244B and 244C are configured by films with a white background being stuck on steps formed in the length direction of the composite test face 236. The white surfaces 244A, 244B and 244C are at different distances from the rotation axle 226A of the reference roll 226, or considered another way, at different distances from the detection position (illumination position) K. In the present exemplary embodiment, widths along the axial direction of the rotation axle 226A of the white surfaces 244A, 244B and 244C that constitute the depth detection portion 244 are each set to 15 mm.

-Separable Structures of the Inline Sensor-

As illustrated in FIG. 3, the inline sensor 200 is configured to be separable into three parts, a center unit 246, an upper unit 248 and a lower unit 250. The illumination section 202 is a principal portion of the center unit 246, the focusing section 208 is a principal portion of the upper unit 248, and the setting section 210 is a principal portion of the lower unit 250.

The upper unit 248 is attachable/detachable at the second casing 10B of the image forming device 10 (see FIG. 1) by sliding in the Z direction. The center unit 246 is attachable/detachable at the upper unit 248 by sliding in the Z direction. The lower unit 250 is attachable/detachable at the center unit 246 and the upper unit 248 by sliding in the Z direction. The lower unit 250, which is disposed at the lower side of the conveyance path 60 of the recording medium P, is only supported in the Z direction by a lower drawer (not illustrated) that is drawn out from the second casing 10B for clearing jams of the recording mediums P. The lower unit 250 is attached to and detached from the center unit 246 and the upper unit 248 in association with insertion and removal of this lower drawer. Specific descriptions are given below.

-Structure of Upper Unit-

As illustrated in FIG. 3, the upper unit 248 is provided with an upper housing 254. The upper housing 254 supports the focusing section 208 and structures a duct 265 (see FIG. 9) and the like. The duct 265 is an example of a main airflow path for cooling. The upper housing 254 is structured to include a focusing system housing 256, which is an example of a first opening member, accommodating the CCD sensor 204 and the focusing optical system 206.

The focusing system housing 256, if viewed in the Z direction, is formed in a substantially rectangular box shape that is longest in the X direction. One X-direction end portion of the focusing system housing 256 (in the present exemplary embodiment, the end portion at the recording medium P conveyance direction upstream side) accommodates the CCD sensor 204. The second mirror 216 and the third mirror 218 are disposed at the other X-direction end portion of the focusing system housing 256. A window portion 256A is formed in a substantially central portion of the focusing system housing 256 in the X direction. The window portion 256A is an example of a first penetration hole through which light enters along the optical axis OA. An optical chamber 205 is provided in the focusing system housing 256, by the window portion 256A being closed of by a window glass 258, which transmit the light, and the interior of the optical chamber 205 is a hermetically sealed (airtight) space. The CCD sensor 204 and suchlike are accommodated in the optical chamber 205.

The upper housing 254 is provided with an upper cover 260 that covers the focusing system housing 256 from above. Thus, a circuit board chamber 264 is formed between an upper wall 256U of the focusing system housing 256 and the upper cover 260. The circuit board 262 at which the control circuit 261 is provided (see FIG. 3 and FIG. 10) is accommodated in the circuit board chamber 264. The upper housing 254 is provided with a duct cover 268 at the outer side of one X-direction end portion of the focusing system housing 256, at the side thereof at which the CCD sensor 204 is disposed. The duct cover 268 covers this end portion of the focusing system housing 256 from the recording medium P conveyance direction upstream side and from the side at which the conveyance path 60 is disposed, and forms the duct 265 in a letter "L" shape in an X-Y cross section.

Figure 9:
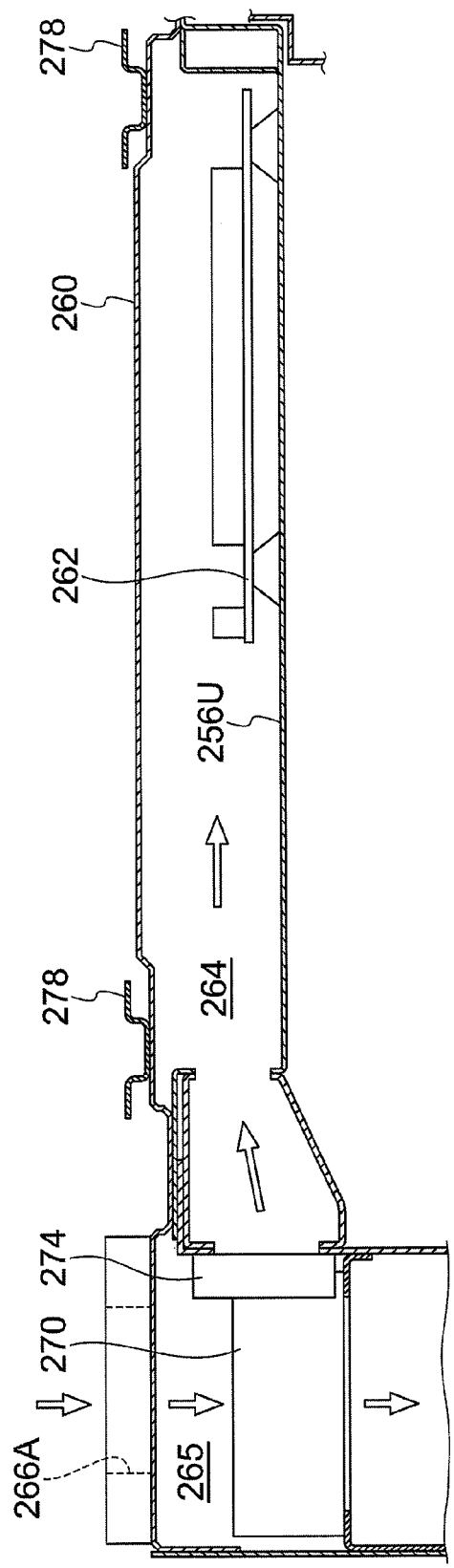
FIG. 9 is a sectional diagram illustrating a circuit board chamber and suchlike provided at the inline sensor relating to the exemplary embodiment of the present invention.

As illustrated in FIG. 3 and FIG. 9, an upper end of the duct 265 serves as an air inlet aperture 266A. An end portion of the duct 265 at the opposite end thereof from the air inlet aperture 266A serves as a connection aperture 266B that is connected to a duct 308, which is an example of a first airflow path in a lamp housing 284 which is described below. A fan 270 is disposed in the duct 265. The fan 270 is an example of an airflow generation unit that produces an air current from above to below in the duct 265. A fan 272 is also disposed in the duct 265. The fan 272 sends air to the optical chamber 205 provided in the focusing system housing 256 (i.e., creates a positive pressure in the optical chamber 205). A further fan 274 is provided in the duct 265 (see FIG. 9). The fan 274 sends air into the circuit board chamber 264.

As illustrated in FIG. 3, the upper housing 254 is further provided with a cover 275 that covers the focusing system housing 256 from the side at which the second mirror 216 and the third mirror 218 are disposed. The cover 275 forms a heat insulation space 276 between the focusing system housing 256 and the cover 275.

Sliders 278, which are long in the Z direction, are provided on the upper housing 254. In this exemplary embodiment, a pair of the sliders 278 is provided on the upper cover 260, side by side in the X direction. The sliders 278 engage with rails provided at a frame (not illustrated) of the second casing 10B. Thus, the sliders 278 are guided by the rails when moving, and the upper unit 248 moves in the Z direction with respect to the second casing 10B.

-Structure of Center Unit-

As illustrated in FIG. 3, the center unit 246 includes the lamp housing 284 and a window cover 288. The lamp housing 284 accommodates the pair of lamps 212. The window cover 288 retains the window glass 286 through which the light of the lamps 212 is emitted toward a recording medium P. The lamp housing 284 is formed as a box shape that opens upward and downward. The upper side open end thereof is closed off by the upper housing 254, and the lower side open end is closed off by the window cover 288.

At the illumination section 202, the light emitted by the lamps 212 is illuminated through the window glass 286 onto the recording medium P, and light reflected from the recording medium P passes through the window glass 286 and enters into the lamp housing 284 along the optical axis OA. The reflected light from the recording medium P, which has entered the lamp housing 284, passes through the window glass 258 of the focusing system housing 256 structuring the focusing section 208 and is guided into the focusing section 208.

The lamp housing 284 is provided with a pair of sliders 290, which are long in the Z direction, protruding as flanges in the X direction from edges of the opening at the upper side of the lamp housing 284. The sliders 290 engage with rails 292 formed on the upper housing 254. Therefore, the sliders 290 are guided by the rails 292 when moving, and the lamp housing 284 is attached and detached in the Z direction with respect to the upper housing 254 (the upper unit 248).

The window cover 288 is configured such that an edge of the window cover 288 and an edge of the window glass 286 do not oppose each other at the recording medium P conveyance direction upstream side of the window cover 288. The two length direction ends of the window glass 286 are pressed against the window cover 288 by mounting springs (not illustrated) in a condition in which the window glass 286 closes off a window portion 288A formed in the window cover 288. In other words, the window glass 286 is configured to be attachable/detachable at the window cover 288.

Further, the window cover 288 is attachable/detachable at the lamp housing 284. Specifically, the window cover 288 has a letter "U" shape opening upward in an X-Y cross section. A pair of sliders 298 are provided at edge portions of this opening. The sliders 298 engage with rails 300 formed at the lamp housing 284. Therefore, the sliders 298 are guided by the rails 300 when moving, and the window cover 288 is attachable and detachable in the Z direction with respect to the lamp housing 284. Accordingly, the window cover 288 of the inline sensor 200 may be individually replaced and cleaned and the like.

Although not illustrated, the center unit 246 and the upper unit 248 are positioned with high precision in the X, Y and Z directions by pins being inserted into holes in association with the relative movement in the Z direction. The upper unit 248 and the casing are also positioned with high precision in the X, Y and Z directions by pins being inserted into holes in association with the relative movement in the Z direction.

-Structure of Lower Unit-

As illustrated in FIG. 3 and FIG. 4, the lower unit 250 is provided with a lower housing 302 that accommodates the reference roll 226 and a pulse motor (not illustrated) that drives the reference roll 226. The lower housing 302 is supported by the lower side drawer as mentioned above, and is positioned in the Z direction by the lower side drawer. The lower unit 250 and the center unit 246 and upper unit 248 are positioned with high precision in the X and Y directions by pins being inserted into holes in association with the relative movement in the Z direction. Thus, the conveyance path 60 of the recording mediums P is disposed between the lower unit 250 and the center unit 246, and the lower unit 250 is positioned in the X, Y and Z directions with respect to the center unit 246 and the upper unit 248.

-Stray Light Prevention-

As illustrated in FIG. 3, a baffle 304 is provided in the lamp housing 284. The baffle 304 is an example of a second opening member that encircles the optical axis OA above the pair of lamps 212.

Figure 8:
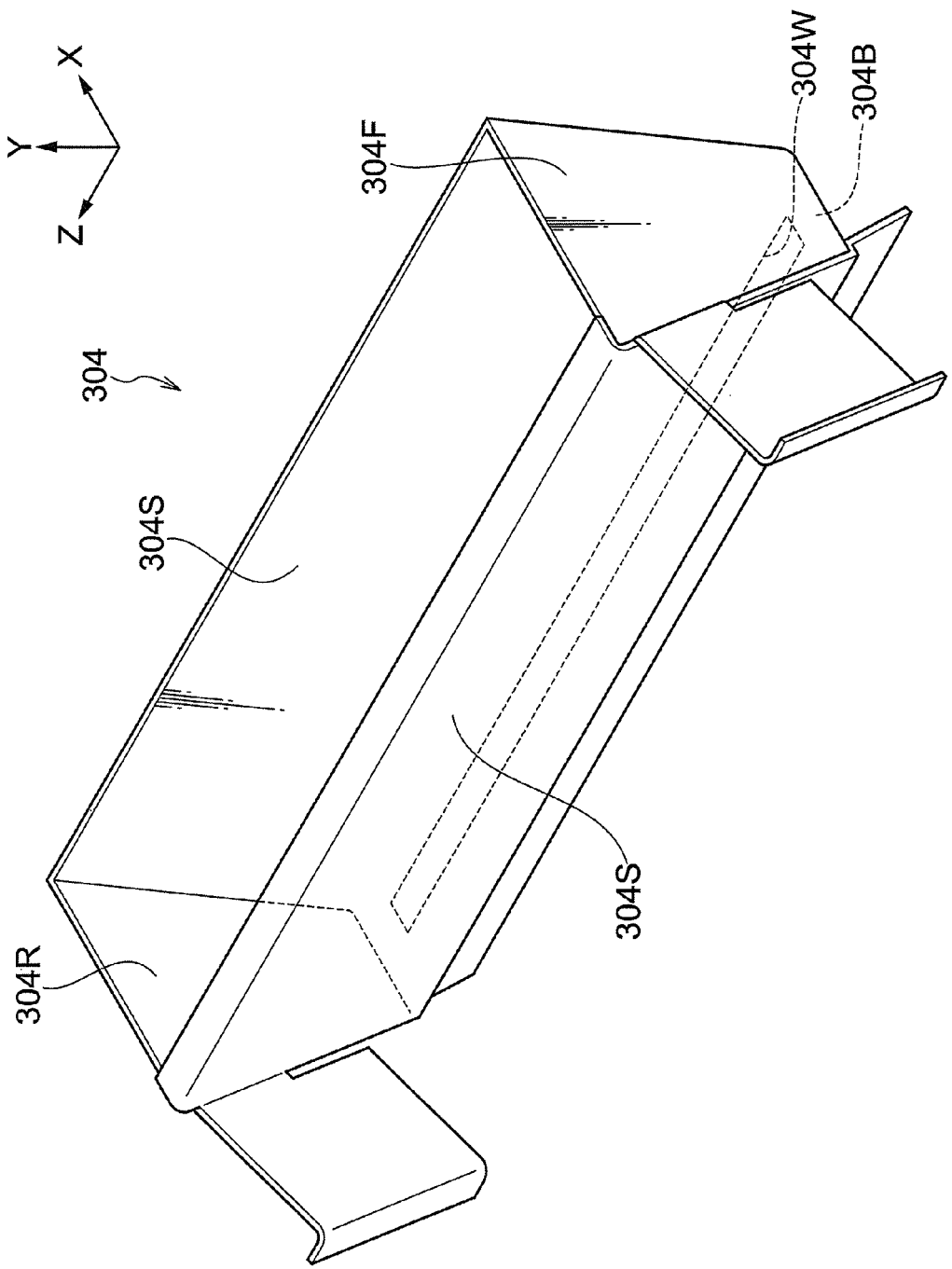
FIG. 8 is a perspective diagram illustrating a baffle that is provided at the inline sensor relating to the exemplary embodiment of the present invention.

As illustrated in FIG. 8, the baffle 304 is configured to include at least a pair of side walls 304S and a floor wall 304B. The side walls 304S are examples of side portions, and the floor wall 304B is an example of a floor portion. In the present exemplary embodiment, the pair of side walls 304S are joined with a pair of front and rear walls 304F and 304R that oppose one another in the Z direction. A lower window 304W is formed in the floor wall 304B. The lower window 304W is an example of a second penetration hole through which the optical axis OA enters (see FIG. 3).

As illustrated in FIG. 3 and FIG. 8, the opening end at the upper side of the baffle 304 encircles the window portion 256A of the focusing system housing 256. Thus, light advancing along the optical axis OA passes through the interior of the baffle 304 and enters the focusing section 208.

The baffle 304 has dimensions and shape specified such that light illuminated from the rear face sides of the lamps 212 does not reach the window portion 256A. That is, a position of an opening edge of the lower window 304W is specified such that light illuminated from the rear face sides of the lamps 212 does not directly reach the window portion 256A. Moreover, inclination angles of the side walls 304S with respect to the optical axis OA are specified such that light irradiated from the rear face sides of the lamps 212 does not reach the window portion 256A even if reflected once.

Plural dividing walls 306 are disposed inside the focusing system housing 256. The dividing walls 306 divide up areas apart from a light guidance path of the focusing optical system 206. The dividing walls 306 include apertures 306A, of which (maximum) sizes of light-passing portions are determined from a limit at which spreading light reflected by the recording medium P is not constricted in the Y direction or the Z direction, in accordance with a spreading angle of the light reflected from the recording medium P.

-Air Flow-

As illustrated in FIG. 3 and FIG. 8, the duct 308 is formed in the lamp housing 284 by one of the side walls 304S (in the present exemplary embodiment, the side wall 304S at the recording medium P conveyance direction upstream side) and a peripheral wall of the lamp housing 284. An upper side opening end of the duct 308 is connected through the connection aperture 266B to the duct 265 when the lamp housing 284 is mounted to the upper housing 254. Thus, the airflow produced by operation of the fan 270 is produced inside the lamp housing 284 too.

An air outlet aperture 310 is formed at a portion of the peripheral wall of the lamp housing 284 that is disposed at the opposite side thereof in the X direction from the side at which the duct 308 is disposed. Thus, the airflow from the duct 265 is guided in the lamp housing 284 by the peripheral wall of the lamp housing 284 and the window cover 288, flows past the recording medium P conveyance direction upstream side first lamp 212A and the downstream side second lamp 212B, passes through the air outlet aperture 310, and is discharged out of the lamp housing 284.

An extension portion 312 protrudes from the lower end of one of the side walls 304S that constitute the duct 308. The extension portion 312 is an example of a shading portion for suppressing light illuminated from the rear face side of the first lamp 212A from reaching the lower window 304W. An amount of extension of the extension portion 312 is specified such that cooling effects of the pair of lamps 212 by the airflow onto the pair of lamps 212 are equivalent.

-Light Amount Restriction Portion-

As illustrated in FIG. 3, the light amount restriction portion 224 includes a side wall 224S, an upper wall 224U and a lower wall 224L, and is in a letter U shape that opens toward the third mirror 218 in an X-Y cross section. A substantially rectangular opening portion 314 is formed in the side wall 224S of the light amount restriction portion 224. A rib 316 depends downward from a free end portion of the upper wall 224U. The light amount restriction portion 224 cuts light from the recording medium P at a lower edge 314L of the opening portion 314 and a lower end 316L of the rib 316, and restricts light amounts in the Y direction.

One length direction end of the light amount restriction portion 224 reaches a wall at the near side (FIG. 3 paper surface side) of the focusing system housing 256, and an adjustment lever (not illustrated) is attached to the one length direction end of the light amount restriction portion 224 through an operation hole formed in this wall.

The light amount restriction portion 224 turns in accordance with operation of the adjustment lever and moves from an initial position in which the light amount is most restricted to attitudes in which the restriction amount is progressively reduced.

-Jam Prevention Structure-

As illustrated in FIG. 3 and FIG. 4, the conveyance path 60 between the center unit 246 (the illumination section 202) and the lower unit 250 (the setting section 210) is configured to be higher at the recording medium P conveyance direction downstream side. Respective corners of the window cover 288 and the lower housing 302 are chamfered or curved. Thus, an entry chute 320 is formed at the inline sensor 200. The entry chute 320 is a guiding-in portion to the recording medium P conveyance direction upstream side.

An upper chute 320U forming an upper portion of the entry chute 320 is configured with a smoothly curved face protruding downward. If a line extended from the detection reference face 228 in the state in which the detection reference face 228 of the reference roll 226 opposes the conveyance path 60 of the recording medium P, as viewed in the Z direction, is denoted IL, the dimensions and shape of the upper chute 320U are specified so as to interfere with the extension line IL (i.e., the protrusion of the upper chute 320U is disposed below the end face extension line IL).

A protrusion portion 322 is formed at the recording medium P conveyance direction downstream side of the window cover 288 relative to the window glass 286. The protrusion portion 322 is structured with a smoothly curved face that protrudes downward. The protrusion portion 322 is disposed at the upper side of the extension line IL.

A lower chute 320L forming a lower portion of the entry chute 320 is brought close to the reference roll 226 by a lower chute member 324 that is fixed to a flange 302F that extends inward from the opening end of the lower housing 302. A recording medium P conveyance direction downstream end of the lower chute member 324 is formed as a curve portion 324A that is rounded so as to protrude upward.

An exit chute 326 is formed between a recording medium P conveyance direction downstream side portion of the protrusion portion 322 and the lower housing 302. A lower chute 326L that forms a lower portion of the exit chute 326 is structured by a lower chute member 328 being fixed to another flange 302F that extends outward from the opening end of the lower housing 302. A recording medium P conveyance direction lower end side of the lower chute member 328 is formed as a curve portion 328A that is rounded so as to protrude upward.

When an image is being detected by the CCD sensor 204, the detection reference face 228 of the reference roll 226 is caused to oppose the recording medium P in an attitude that is substantially parallel with the window glass 286. The guide surfaces 238 provided at the two sides of the detection reference face 228 receive the recording medium P from the entry chute 320 and guide the recording medium P toward the exit chute 326.

On the other hand, when an image is not being detected by the CCD sensor 204, the retraction face 230 of the reference roll 226 is caused to oppose the recording medium P in an attitude in which the retraction face 230 is closer to the window glass 286 toward the recording medium P conveyance direction downstream side (a non-parallel attitude). The retraction face 230 is a broad face that extends from the curve portion 324A of the lower chute member 324 to near the exit chute 326. The retraction face 230 receives the recording medium P from the entry chute 320 and guides the recording medium P toward the exit chute 326.

-Operation of the Inline Sensor-

As illustrated in FIG. 3 and FIG. 4, the inline sensor 200 illuminates light from the pair of lamps 212 at a recording medium P passing between the illumination section 202 and the setting section 210. Light reflected from the recording medium P is guided along the optical axis OA to the focusing section 208, and is focused on the CCD sensor 204 by the focusing optical system 206 of the focusing section 208. The CCD sensor 204 outputs signals according to image densities at respective positions of the image, and image formation positions and the like, to the control device 192 of the image forming device 10. At the control device 192, image densities, image formation positions and the like are corrected in accordance with the signals from the CCD sensor 204 (also see FIG. 10).

When the CCD sensor 204 comprising the inline sensor 200 is to be calibrated, first, the pulse motor 251 of the lower unit 250 operates, the reference roll 226 turns and the white reference face 232 opposes the conveyance path 60 of the recording medium P. The CCD sensor 204 outputs a shading correction signal that corrects a light amount distribution in the Z direction (the fast scanning direction).

Then, the reference roll 226 turns and the composite test face 236 illustrated in FIG. 5 opposes the conveyance path 60 of the recording medium P. The position detection patterns 240 (see FIG. 6), focus detection patterns 242 (see FIG. 6) and depth detection portions 244 (see FIG. 7) are read, and detection positions, focus, and output characteristics are detected (also see FIG. 10).

Further, the color reference face 234 opposes the conveyance path 60 of the recording medium P. The CCD sensor 204 is automatically adjusted for each color such that signals of pre-specified intensities are outputted.

-Calibration of the CCD Sensor-

Next, a calibration and testing sequence of the CCD sensor 204 using the composite test face 236 is specifically described.

As described above, the reference roll 226 turns and the composite test face 236 is caused to oppose the conveyance path 60 of the recording medium P.

First, the CCD sensor 204 of the focusing section 208 detects the position detection pattern 240, and the control device 192 adjusts the rotation angle on the basis of the detection results. That is, the control device 192 (see FIG. 1, FIG. 4 and FIG. 10) adjusts the rotation angle of the reference roll 226 such that the reflection light reflected from the composite test face 236 matches the detection position K, which is to say, such that the reflected light is precisely reflected along the optical axis OA.

More specifically, the letter N pattern illustrated in FIG. 6 is detected along the Z direction (the fast scanning direction), and the three diagonal portions 240B between the respective linear portions 240A and 240C are detected. The control device 192 (see FIG. 1, FIG. 4 and FIG. 10) sends control signals to the control circuit 261 (see FIG. 4 and FIG. 10) and the pulse motor 251 drives, and the rotation angle of the reference roll 226 is adjusted such that the gap between each linear portion 240A and diagonal portion 240B is equal to the gap between the linear portion 240C and diagonal portion 240B.

Then, after the rotation angle of the reference roll 226 has been adjusted, the CCD sensor 204 of the focusing section 208 detects the focus detection patterns 242, and the control device 192 confirms whether the focal point at the detection position K is within a reference range.

The CCD sensor 204 of the focusing section 208 detects the depth detection portion 244, and the control device 192 checks whether output is constant independent of illumination depth. That is, the control device 192 checks whether light amount outputs of reflected light reflected at each of the three white faces 244A, 244B and 244C comprising the depth detection portion 244 (see FIG. 7), which are at different distances from the detection position K, are all within a pre-determined range.

The calibration and testing of the CCD sensor 204 as described above is carried out, for example, when a power supply of the image forming device 10 is turned on (roughly once per day). Alternatively, calibration of the image forming device 10 based on signals from the CCD sensor 204 (adjustment of the aforementioned exposure unit 40 and the like) is carried out, for example, each time at least a pre-specified amount of jobs of forming images on recording mediums P is completed (in the order of ten times per day).

If a detection value of the position detection pattern is an abnormal value outside the adjustment range, or if the result of checking the focal point or illumination depth is that the control device 192 determines that there is a problem, then, for example, a warning is given at a control panel (not illustrated) or suchlike.

-Operation and Effects-

As illustrated in FIG. 5, because the position detection pattern 240, focus detection pattern 242 and depth detection portion 244 are collected on one face of the reference roll 226, that is, the composite test face 236, the detections are carried out in a short duration. In other words, there is no need for the reference roll 226 to be turned in accordance with the purposes of calibration and testing or the like. Thus, detection is performed in a short duration.

The depth detection portion 244 is detected (see FIG. 7) after the rotation angle of the reference roll 226 has been adjusted in accordance with the position detection patterns 240, that is, in a state in which the composite test face 236 is adjusted in angle so as to precisely face along the optical axis. Therefore, the detection accuracy of illumination depth is improved.

Similarly, the focus detection pattern 242 is detected after the rotation angle of the reference roll 226 has been adjusted in accordance with the position detection patterns 240. Therefore, the detection accuracy of the focal point is improved.

Because the detections of the white reference face and the color reference face are carried out after the position detection patterns 240 have been detected, the angle may be adjusted such that reflected light from the white reference face and/or color reference face is precisely aligned with the optical axis OA. Similarly, the angle of the detection reference face 228 may be adjusted on the basis of detection results of the position detection patterns 240.

-Other Embodiments-

The present invention is not limited to the exemplary embodiment described above.

For example, other patterns, references and the like may be provided in addition to the position detection pattern 240 (see FIG. 6), focus detection pattern 242 (see FIG. 6) and depth detection portion 244 (see FIG. 7) on the composite test face 236 in the above exemplary embodiment.

In the above exemplary embodiment, the position detection pattern 240 (see FIG. 6) is provided at both the rotation axis direction end portions of the composite test face 236, the focus detection pattern 242 (see FIG. 6) is provided at the inner side of the position detection pattern 240 at each of the two end portions of the composite test face 236, and the depth detection portion 244 (see FIG. 7) is provided at the inner side of the focus detection pattern 242 at each of the two end portions of the composite test face 236 and at the central portion, but this is not a limitation. The same may be provided at other locations.

The position detection pattern 240 (see FIG. 6), the focus detection pattern 242 (see FIG. 6) and the depth detection portion 244 (see FIG. 7) on the composite test face 236 are examples, and are not limitations. Other patterns and shapes may be used.

As a further example, in the above exemplary embodiment, the present invention is employed in an image forming device that forms images on recording mediums with what is known as an electro photography system, but this is not a limitation. For example, the present invention may be employed in an image forming device that forms images on recording mediums with another image forming system such as an inkjet system or the like.

As a further example, light is illuminated from a front face side of a recording medium P in the above exemplary embodiment, but this is not a limitation. If a recording medium that transmits light is used, light may be illuminated from the rear face side of the recording medium.

The meaning of the term "light from a recording medium" is intended to include transmitted light transmitted through a recording medium and reflected light reflected by a recording medium, and, more broadly, light with which information relating to images formed on recording mediums, positions and shapes of recording mediums, and the like may be detected. The meaning of the term "transmission" is intended to include, as well as light that passes through a window glass and the like, light that passes through a focusing lens and the like. The meaning of the term "detection of a recording medium P" is intended to include detection of the position and shape of a recording medium P.

It will be clear that various embodiments can be made within a technical scope not departing from the spirit of the present invention.

What is claimed is:

1. A detection device comprising:
   a detection section comprising
      an illumination unit that illuminates light toward a conveyance path along which a medium is conveyed, and
      a light-sensing unit that senses reflected light of the light illuminated from the illumination unit,
   the detection section detecting at least one of an image on the medium conveyed along the conveyance path or the medium; and
   a reference section comprising a reference member that is disposed at an opposite side of the conveyance path from the side thereof at which the illumination unit is disposed and that is provided to be rotatable with a rotation axis direction being a width direction of the medium, the reference member having a polygonal rod shape that includes a plurality of reflection faces that reflect the light illuminated by the illumination unit toward the detection section, and the reference member being configured such that any of the reflection faces may be caused to oppose the conveyance path by rotation of the reference member;
   wherein one of the reflection faces of the reference member comprises a test face comprising a position detection pattern, a focal point detection pattern and a depth detection pattern,
   wherein the detection section detects a position of the test face in the direction of rotation via the position detection pattern;

wherein the detection section detects a focal point via the focal point detection pattern; and wherein the detection section detects an illumination depth of the light illuminated from the illumination unit via the depth detection portion.

2. The detection device according to claim 1, wherein the position detection pattern is provided at each of two rotation axis direction end portions of the test face, the focal point detection pattern is provided at the rotation axis direction inner side of each of the position detection patterns at the two rotation axis end portions of the test face, and the depth detection portion is provided at the rotation axis direction inner side of each of the focal point detection patterns at the two rotation axis end portions of the test face and at a rotation axis direction central portion of the test face.

3. The detection device according to claim 1, wherein the position detection pattern includes a pattern in the shape of the letter N, with the vertical direction of the letter being the conveyance direction, the focal point detection pattern includes a pattern in which a plurality of lines along the conveyance direction are arrayed in the rotation axis direction, and the depth detection portion includes a step portion configured by a plurality of faces at different distances from the conveyance path.

4. The detection device according to claim 1, further comprising a control section that controls a rotation angle of the reference member on the basis of results of detection of the position detection pattern by the detection section, wherein, after the control section controls the rotation angle of the reference member, the detection section detects the depth detection portion.

5. An image forming device comprising:

an image forming section that forms an image on a medium; and the detection device of claim 1.

\* \* \* \* \*